US008665672B2

(12) United States Patent
Soeda et al.

(10) Patent No.: US 8,665,672 B2
(45) Date of Patent: Mar. 4, 2014

(54) PROCESS FOR PRODUCING CAPACITIVE ELECTROMECHANICAL CONVERSION DEVICE, AND CAPACITIVE ELECTROMECHANICAL CONVERSION DEVICE

(75) Inventors: Yasuhiro Soeda, Yokohama (JP); Takahiro Ezaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 12/996,749

(22) PCT Filed: Jun. 4, 2009

(86) PCT No.: PCT/JP2009/060650

§ 371 (c)(1), (2), (4) Date: Dec. 7, 2010

(87) PCT Pub. No.: WO2009/151089

PCT Pub. Date: Dec. 17, 2009

(65) Prior Publication Data

US 2011/0084570 A1 Apr. 14, 2011

(30) Foreign Application Priority Data

Jun. 9, 2008 (JP) ................................. 2008-150224

(51) Int. Cl.
*G01S 1/74* (2006.01)

(52) U.S. Cl.
CPC ........................................ *G01S 1/74* (2013.01)
USPC .......................................................... 367/181

(58) Field of Classification Search
USPC .......................................................... 367/181
See application file for complete search history.

(56) References Cited

U.S. PATENT DOCUMENTS

| | | | | |
|---|---|---|---|---|
| 6,958,255 | B2 | 10/2005 | Khuri-Yakub et al. | |
| 7,451,651 | B2 * | 11/2008 | Woychik et al. | 73/641 |
| 7,500,954 | B2 * | 3/2009 | Wilser et al. | 600/467 |
| 7,612,483 | B2 * | 11/2009 | Degertekin | 310/309 |
| 7,646,133 | B2 * | 1/2010 | Degertekin | 310/309 |
| 2003/0013969 | A1 * | 1/2003 | Erikson et al. | 600/459 |
| 2004/0054287 | A1 * | 3/2004 | Stephens | 600/459 |
| 2004/0085858 | A1 * | 5/2004 | Khuri-Yakub et al. | 367/181 |

(Continued)

FOREIGN PATENT DOCUMENTS

| | | |
|---|---|---|
| JP | 2007-047100 A | 2/2007 |
| JP | 2007-071700 A | 3/2007 |
| JP | 2008-235628 A | 10/2008 |

OTHER PUBLICATIONS

International Search Report for App. No. PCT/JP2009/060650.*

(Continued)

*Primary Examiner* — Isam Alsomiri
*Assistant Examiner* — James Hulka
(74) *Attorney, Agent, or Firm* — Canon U.S.A., Inc., IP Division

(57) ABSTRACT

A process for producing a capacitive electromechanical conversion device by bonding together a substrate and a membrane member to form a cavity sealed between the substrate and the membrane member, the process for producing a capacitive electromechanical conversion device comprises the steps of: providing a gas release path penetrating from a bonded interface between the substrate and the membrane member to the outside, and forming the cavity by bonding the membrane member with the substrate with the gas release path provided; the gas release path being provided at a location where the path does not communicate with the cavity.

10 Claims, 17 Drawing Sheets

(56) References Cited

U.S. PATENT DOCUMENTS

| | | | | |
|---|---|---|---|---|
| 2005/0200242 | A1* | 9/2005 | Degertekin | 310/334 |
| 2005/0203397 | A1* | 9/2005 | Degertekin | 600/437 |
| 2005/0247992 | A1 | 11/2005 | Tsukamoto et al. | |
| 2006/0075818 | A1 | 4/2006 | Huang et al. | |
| 2006/0118939 | A1* | 6/2006 | Fisher et al. | 257/690 |
| 2006/0276711 | A1* | 12/2006 | Yuan et al. | 600/437 |
| 2007/0013264 | A1* | 1/2007 | Wilser et al. | 310/311 |
| 2007/0013269 | A1* | 1/2007 | Huang | 310/334 |
| 2007/0155056 | A1 | 7/2007 | Kang et al. | |

OTHER PUBLICATIONS

Auturo A. Ayon et al., Characterization of silicon waferbonding for Power MEMS appplication, Sensors and Actuators.

International Preliminary Report on Patentability, dated Dec. 23, 2010, International Application No. PCT/JP2009/060650.

* cited by examiner

PROCESS FOR PRODUCING CAPACITIVE ELECTROMECHANICAL CONVERSION DEVICE, AND CAPACITIVE ELECTROMECHANICAL CONVERSION DEVICE

TECHNICAL FIELD

The present invention relates to a process for producing a capacitive electromechanical conversion device such as a transmitting and receiving element used in ultrasonic probes for ultrasonic diagnostic apparatuses, and to a capacitive electromechanical conversion device.

BACKGROUND ART

An ultrasonic transducer carries out at least one of the conversion from an electrical signal to ultrasonic and the conversion from ultrasonic to an electrical signal, and is used as a probe for medical imaging and nondestructive testing.

A form of ultrasonic transducer is a capacitive electromechanical conversion device.

U.S. Pat. No. 6,958,255 describes a technology relating to such a capacitive electromechanical conversion device, and FIG. 11 is a sectional view of the basic structure thereof. A silicon single-crystal layer 1101 has electrical conductivity and an electrically insulating layer 1106 is formed on the surface thereof. On the electrically insulating layer 1106, a depressed portion 1104 is formed. To the surface on which the depressed portion 1104 is formed, a membrane member 1102 is bonded in an approximate vacuum. The depressed portion 1104 is an empty space sealed to maintain the approximate vacuum, constituting a cavity. Here, in the present Conventional Example, the depressed portion and the cavity are the same space, so sometimes both are shown with the same reference number 1104.

The present Conventional Example is an example where the silicon single-crystal layer 1101 forms a substrate for a capacitive electromechanical conversion device and also functions as an electrode. The membrane member 1102 is supported by a support portion 1103 formed in the electrically insulating layer 1106. An electrode 1105 is formed on the membrane member 1102 in the center of the cavity 1104, and a capacitor is formed between silicon single-crystal layer 1101 and the electrode 1105.

FIGS. 12A to 12D illustrate the main steps of the process for producing a capacitive electromechanical conversion device, shown in FIG. 11. First, a substrate 1107 is formed in the preceding step illustrated in FIG. 12A. On the substrate 1107, the silicon single-crystal layer 1101, the support portion 1103, the depressed portion 1104, and the electrically insulating layer 1106 are formed. In addition, a silicon-on-insulator (SOI) wafer 1108 is prepared. The SOI wafer 1108 has a structure where a handle layer 1109 comprising a silicon single crystal, a buried oxide film layer 1110 comprising silicon oxide, and a device layer 1111 comprising a silicon single crystal are laminated together in this order. The device layer 1111 is to be the membrane member 1102 in a subsequent step. In addition, the handle layer 1109 and the buried oxide film layer 1110 function as membrane support layers until the device layer 1111, i.e., the membrane member 1102, is bonded to the substrate 1107.

As illustrated in FIG. 12B, the surface on which the support portion 1103 for the substrate 1107 is formed and the device layer 1111 of the SOI wafer 1108 are directly bonded together. This direct joining is carried out in an approximate vacuum, sealing the cavity 1104 to maintain the approximate vacuum.

Next, as illustrated in FIG. 12C, the handle layer 1109 and the buried oxide film layer 1110 are removed by etching or polishing, forming the membrane member 1102. Finally, as illustrated in FIG. 12D, the electrode 1105 is formed. Here, although FIG. 11 and FIGS. 12A to 12D illustrate only an element, a plurality of elements is generally arranged in a one-dimensional or two-dimensional array.

Unfortunately, the process for producing a capacitive electromechanical conversion device can cause a poorly bonded portion in the step of bonding together the silicon single-crystal surface and the silicone oxide surface. An element having a poorly bonded portion can fail to function as a capacitive electromechanical conversion device adequately. Poor bonding is caused partly by the accumulation (at the bonded interface) of water and/or oxygen generated at the bonded interface. Water and oxygen come from a hydroxy group (OH) involved in the direct bonding. As a method of solving this problem, a proposal where poor bonding in direct bonding is reduced by annealing is disclosed (see Arturo A. Ayon et al., Characterization of silicon wafer bonding for Power MEMS applications, Sensors and Actuators A 103 (2003) 1-8). In addition, there is a proposal of a technology relating to the arrangement of an absorbing material and an absorbing agent to absorb the gas generated at the bonded interface (see U.S. Pat. No. 6,958,255).

DISCLOSURE OF THE INVENTION

However, the method using annealing requires a few tens to a few hundreds of hours for the annealing step, which may reduce productivity. In addition, a capacitive electromechanical conversion device used in ultrasonic probes for ultrasonic diagnostic apparatuses requires a plurality of elements to be highly densely arranged in a one-dimensional or two-dimensional array. On the other hand, the method using a gas-absorbing agent can cause the difficulty in making the elements finer in the arrangement in an array.

In addition, a gas-absorbing agent can cause a change in the state of the bonded interface due to a change associated with absorption. For this reason, a capacitive electromechanical conversion device requiring a sufficient bonding strength at narrow support portions can cause poor bonding and the like due to the gas generated during the production of the element.

The present invention is directed to a process for producing a capacitive electromechanical conversion device by bonding together a substrate and a membrane member to form a cavity sealed between the substrate and the membrane member, the process for producing a capacitive electromechanical conversion device comprising the steps of:

providing a gas release path penetrating from a bonded interface between the substrate and the membrane member to the outside, and forming the cavity by bonding the membrane member with the substrate with the gas release path provided;

the gas release path being provided at a location where the path does not communicate with the cavity.

In the process for producing a capacitive electromechanical conversion device, a depressed portion can be formed on the surface of the substrate, and the membrane member on the whole is in thin film form, and the cavity is formed at the depressed portion by bonding the membrane member with the substrate.

The gas release path can be provided so that the path extends around the bonded interface and communicates with the outside.

The gas release path can be provided so that the path extends from the bonded interface through the membrane member and communicates with the outside.

The gas release path can be provided so that the path extends from the bonded interface through the substrate and communicates with the outside.

In the process for producing a capacitive electromechanical conversion device, in bonding the membrane member with the substrate, the bonding can be carried out with the membrane member supported by a membrane support layer, and the gas release path can be provided so that the path extends from the bonded interface through the membrane member and the membrane support layer and communicates with the outside.

The membrane support layer can be removed after bonding the membrane member with the substrate.

In the process for producing a capacitive electromechanical conversion device, bonding the membrane member with the substrate can be carried out at a pressure lower than atmospheric pressure.

The present invention is directed to a capacitive electromechanical conversion device obtained by bonding together a substrate and a membrane member to form a cavity sealed between the substrate and the membrane member, characterized in that a gas release path penetrating from a bonded interface between the substrate and the membrane member to the outside and not communicating with the cavity is provided in at least one of the substrate and the membrane member.

The substrate can be a substrate on the surface of which a depressed portion is formed, the membrane member on the whole is in thin film form, and the depressed portion can form the cavity.

According to the present invention, poor bonding at the bonded interface in producing a capacitive electromechanical conversion device can be reduced when a cavity is formed between a substrate and a membrane member, because the gas release path is formed and allows the gas, moisture, and the like generated during the production of the element to be released to the outside.

Further features of the present invention will become apparent from the following description of exemplary embodiments with reference to the attached drawings.

BEST MODES FOR CARRYING OUT THE INVENTION

Figure 1A:
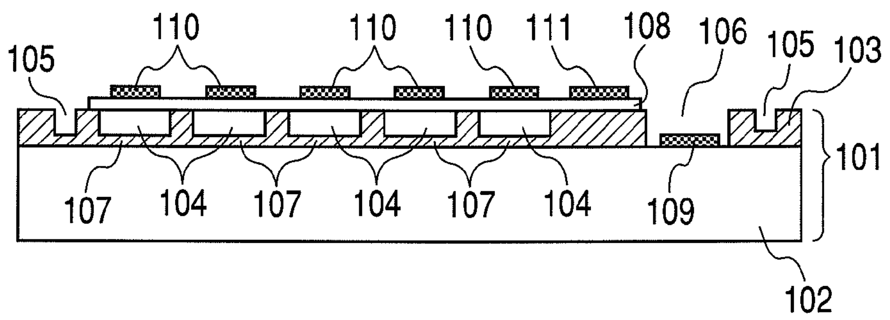
FIGS. 1A and 1B are diagrams illustrating Example 1 relating to an element to which the present invention is applicable.

A preferred embodiment of the present invention will now be described in detail in accordance with the accompanying drawings.

In a basic embodiment of the process for producing a capacitive electromechanical conversion device according to the present invention, a substrate and a membrane member are bonded together to form a sealed cavity between the substrate and the membrane member. In this case, the cavity is formed by bonding the membrane member with the substrate with a gas release path penetrating through the bonded interface between the substrate and the membrane member to the outside provided. The membrane member provided on the cavity functions as a vibrating membrane (vibrating portion). Because in this way, the substrate and the membrane member are bonded at least during bonding with a path communicating from the bonded portion to the outside provided, the gas, moisture, and the like generated during production are successfully released to the outside. In addition, the cavity is sealed because the gas release path is provided at a location where the path does not communicate with the cavity.

The form of the substrate and the form of the membrane member are not limited. It is only necessary that bonding both together form a gap between the membrane member and the surface of the substrate, forming a sealed cavity at the gap. For example, a possible form is that the substrate is a substrate on the surface of which a depressed portion is formed, the membrane member on the whole is in thin film form, and the substrate and the membrane member are bonded together to form a cavity at the depressed portion. Another possible form is that a depressed portion is formed on a membrane member and the substrate and the membrane member are bonded together to form a cavity.

The gas release path can also take various forms. For example, a gas release path can be provided so that the path extends around the bonded interface to communicate with the outside. In this case, the gas release path may be formed as a depressed portion on the substrate side, formed as a depressed potion on the membrane member side, or formed by forming depressed portions on both sides and bonding both together.

In addition, a gas release path can also be provided so that the path extends from the bonded interface through the membrane member to communicate with the outside. Moreover, a gas release path can also be provided so that the path extends from the bonded interface through the substrate to communicate with the outside. Furthermore, in the step of bonding the membrane member with the substrate, a gas release path can also be provided so that the membrane member is bonded with the membrane member supported by the membrane support layer and the path extends from the bonded interface through the membrane member and the membrane support layer to communicate with the outside. In this case, the membrane support layer is removed after the step of bonding the membrane member with the substrate.

The substrate and the membrane member are typically bonded together at a lower pressure than atmospheric pressure to form a cavity sealed at such a pressure.

In addition, in the basic embodiment of the capacitive electromechanical conversion device of the present invention, the substrate and the membrane member are bonded together to form a sealed cavity between the substrate and the membrane member. Moreover, a gas release path penetrating through the bonded interface to the outside is provided at least one of the substrate and the membrane member. Even in the embodiment of the capacitive electromechanical conversion device, as described above, the substrate, the membrane member, and the gas release path can take various forms.

In addition, the capacitive electromechanical conversion device of the present invention has at least one cavity and typically has a plurality of cavities arranged in arrays on the substrate. A smaller gap between the substrate and the vibrating portion of the membrane member provides a higher electromechanical transduction coefficient of the element and the size of the cavities and the like needs only to be designed in different sizes depending on the intended use. Generally, the size is designed to be in the range of a few tens of nanometers to a few micrometers. The capacitive electromechanical conversion device of the present invention can be used as a sensor for various physical quantities and the like in addition to the capacitive ultrasonic transducer of an Example described later.

Examples of the present invention will be described below by using figures.

Example 1

Figure 1B:
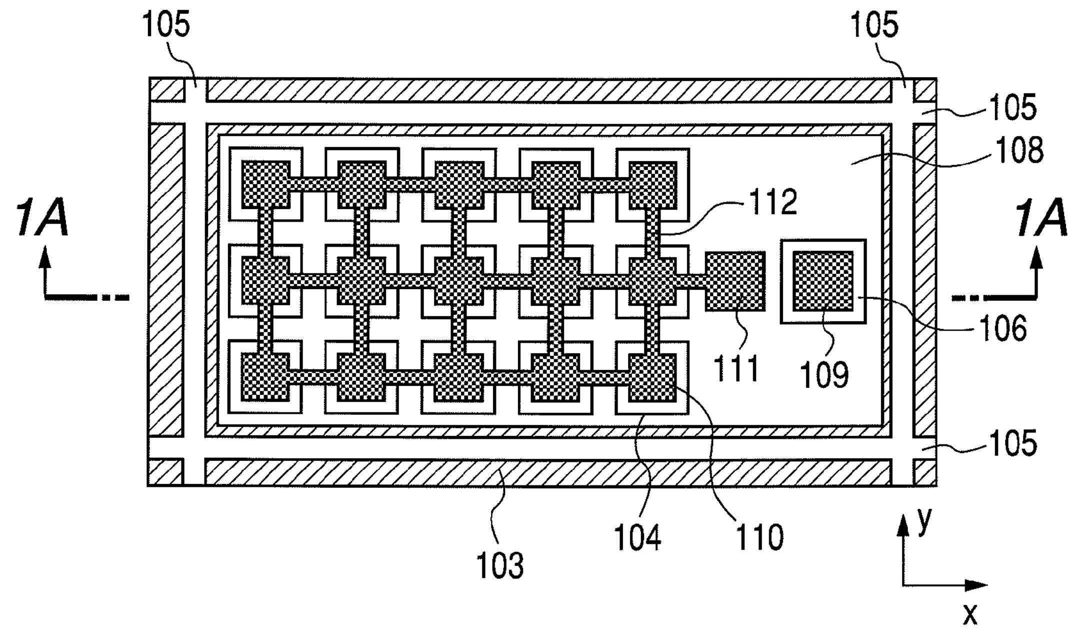

FIGS. 1A and 1B are a sectional view and a plan view, respectively, illustrating Example 1 relating to the capacitive electromechanical conversion device of the present invention. The same location has the same reference number. The sectional view of FIG. 1A corresponds to the 1A-1A location of FIG. 1B. In the present Example, a substrate 101 includes a silicon single-crystal layer 102, and a silicon oxide film layer 103 formed on the top surface thereof. The silicon single-crystal layer 102 is a substrate for the capacitive electromechanical conversion device, is electrically conductive, and also functions as an electrode. In the silicon oxide film layer 103, cavities (depressed portions) 104, grooves 105 as gas release paths, an electrode extraction portion 106, and electrically insulating layers 107 are formed. In addition, a membrane member 108 is bonded to the silicon oxide film layer 103. The membrane member 108 on the whole is in thin film, the portions formed above the cavities function as vibrating membranes.

The cavities 104 are sealed to maintain an approximate vacuum by the membrane member 108. The electrode extraction portion 106 is created by removing the membrane member 108 and the silicon oxide film layer 103 there, and an electrode 109 to be electrically connected to the silicon single-crystal layer 102 is provided at that portion. As illustrated in FIG. 1B, the cavities 104 are square or rectangular, and are arranged in a two-dimensional array in the center of a substrate 101. The square or rectangular cavity shape allows for as small gaps between the cavities 104 as possible when the cavities are arranged in a two-dimensional array. Therefore, an advantage is that cavity area can be made large with respect to element area. In the present Example, an example where 5 cavities 104 are arranged in the x-direction and 3 cavities 104 are arranged in the y-direction is illustrated. The grooves 105 are provided around the cavities 104 arranged in a two-dimensional array. The grooves 105 are formed on the surface of the silicon oxide film layer 103, and their ends reach the ends of the substrate 101 and open to the outside.

The grooves 105 form gas release pores extending along the bonded interface to penetrate to the outside when the silicon oxide film layer 103 and the membrane member 108 are bonded together. Through the gas release pores, the gas, moisture, and the like generated at the bonded interface when the silicon oxide film layer 103 and the membrane member 108 are bonded together are exhausted to the outside. In addition, the cavities 104 and the grooves 105 do not communicate with each other. Therefore, the cavities 104 can be sealed to maintain an approximate vacuum by the membrane member 108.

As described above, the electrode 109 is provided at the electrode extraction portion 106 and is an electrode to be electrically connected to the silicon single-crystal layer 102. In addition, electrodes 110 are formed on the membrane member 108 (vibrating portion) in the center of the cavities 104. A plurality of the electrodes 110 arranged in a two-dimensional array is electrically connected to an electrode 111 by wires 112. The electrode 111 is an electrode to electrically extract the electrodes 110 to the outside.

Figure 2A:
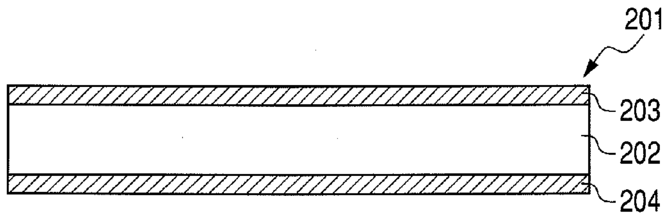
FIGS. 2A, 2B, 2C, 2D, 2E, 2F, 2G, 2H, 2I, 2J, 2K, 2L, 2M, 2N, 2O and 2P are diagrams illustrating an example of a process for producing the element illustrated in FIGS. 1A and 1B.

An example of a process for producing the capacitive electromechanical conversion device having the structure above will be described below. FIGS. 2A to 2P are diagrams illustrating this process for producing the capacitive electromechanical conversion device. The same location has the same reference number. The production process of the present Example begins at a substrate 201, a sectional view of which is illustrated in FIG. 2A. The substrate 201 includes a silicon single-crystal layer 202, and a silicon oxide film layer 203 and a silicon oxide film layer 204 that are formed on the top surface and bottom surface thereof, respectively.

Figure 2B:
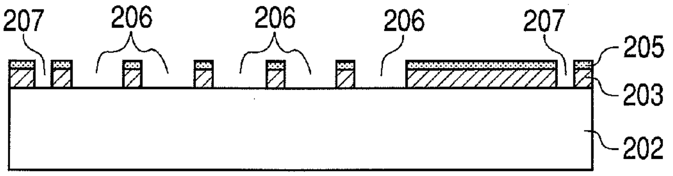
Figure 2C:
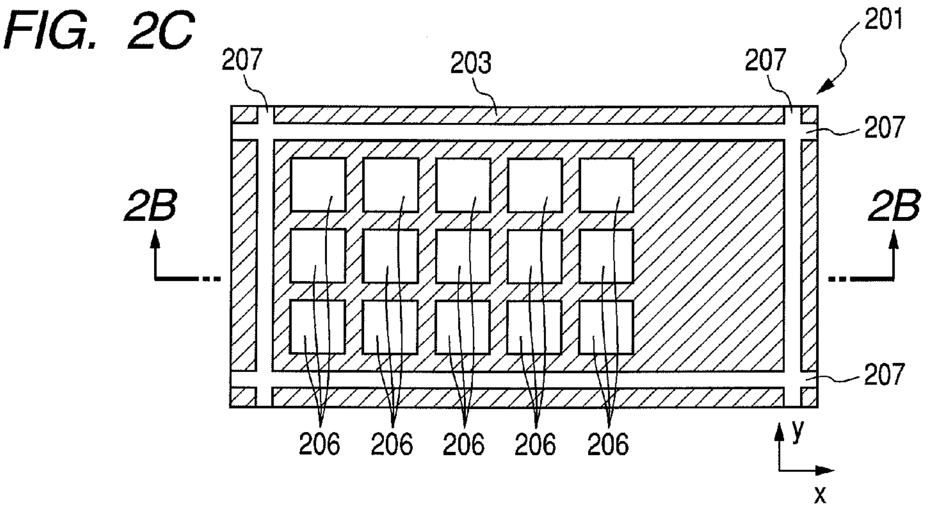

First, as illustrated in FIG. 2B, a photoresist layer 205 is used as an etching resist and the silicon oxide film layer 203 is etched to form cavities (depressed portions) 206 and grooves 207. The grooves 207 function as gas release pores in a subsequent step. If a hydrofluoric acid is used for etching, the silicon single-crystal layer 202 functions as an etch stop layer, making it easy to control the amount of etching in the depth direction. The planar shapes of the cavities 206 and the grooves 207 seen from the silicon oxide film layer 203 side are illustrated in FIG. 2C. The sectional view illustrated in FIG. 2B corresponds to the 2B-2B location illustrated in FIG. 2C. The cavities 206 are square or rectangular, and arranged in a two-dimensional array in the center of the substrate 201.

As described above, the square or rectangular cavity shape allows for as small gaps between the cavities 206 as possible when the cavities are arranged in a two-dimensional array. Therefore, an advantage is that cavity area can be made large with respect to element area. The grooves 207 are provided to surround the cavities 206, and reach the ends of the substrate 201.

Figure 2D:
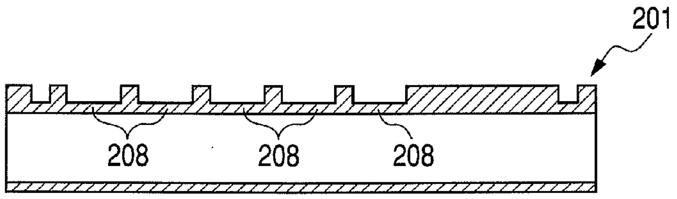

Next, as illustrated in FIG. 2D, after the photoresist layer 205 is removed, a silicon dioxide film is formed across the substrate 201. In this way, electrically insulating layers 208 are formed on the surface of the silicon single-crystal layer 202 of the cavities 206. The electrically insulating layers 208 are provided to maintain the electrical insulation with the silicon single-crystal layer 202 even when a device layer (membrane member) 212 formed in a subsequent step is bent by ultrasonic vibrations or an external static pressure and comes into contact with the bottom of the cavities 206.

Figure 2E:
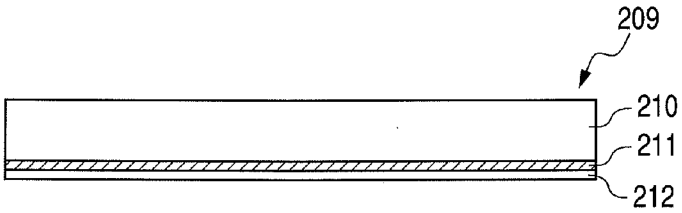

Next, as illustrated in FIG. 2E, an SOI wafer 209 is prepared. The SOI wafer 209 has a structure where a handle layer 210 comprising a silicon single crystal, a buried oxide film layer 211 comprising a silicon oxide, and a device layer 212 comprising a silicon single crystal are laminated together in this order.

Figure 2F:
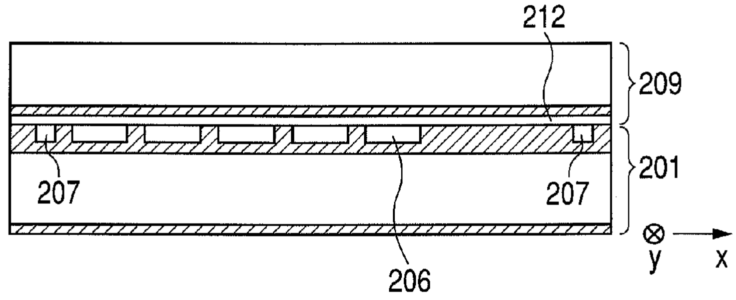
Figure 2G:
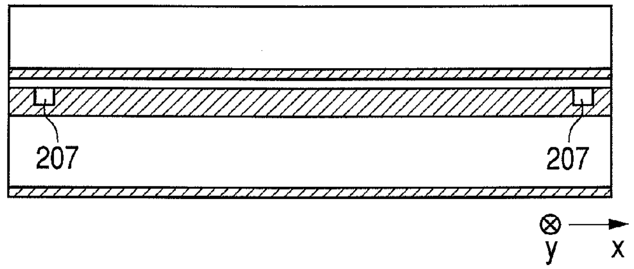
Figure 2H:
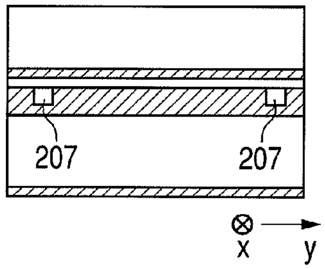

As illustrated in FIG. 2F, the surface of the device layer 212 of the SOI wafer 209 and the surface of the substrate 201 on which the cavities 206 and the grooves 207 are formed are bonded together by direct bonding. The bonding is carried out in an approximate vacuum to seal the inside of the cavities 206 to maintain the approximate vacuum. The end faces of the bonded substrate are illustrated in FIGS. 2G and 2H. FIGS. 2G and 2H are diagrams of the substrate processed in the same step as in FIG. 2F seen in the y-direction and the x-direction, respectively. As illustrated in FIGS. 2G and 2H, the grooves 207 open to the end faces of the bonded substrate. In addition, although not illustrated, the grooves 207 also open to the opposite faces of the end faces illustrated in FIGS. 2G and 2H. Through the grooves 207 as gas release paths, the water and gases such as oxygen generated at the bonded interface during direct bonding are removed from the bonded interface to the outside.

Figure 2I:
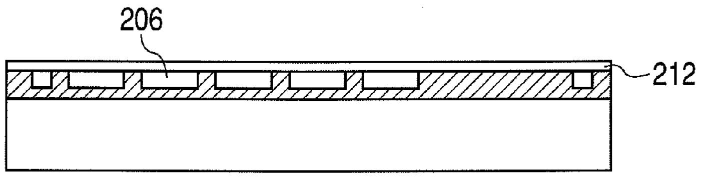

Next, as illustrated in FIG. 2I, the handle layer 210 and the buried oxide film layer 211 are removed from the SOI wafer 209 by etching or polishing. The device layer 212 remaining is to be a membrane member. In addition, the handle layer 210 and the buried oxide film layer 211 function as membrane support layers until the device layer 212, i.e., the membrane member is bonded to the substrate 201. The use of a hydrofluoric acid to remove the buried oxide film layer 211 can selectively leave the device layer 212 comprising a silicon single crystal.

Figure 2J:
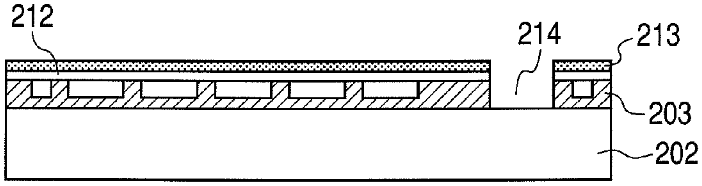
Figure 2K:
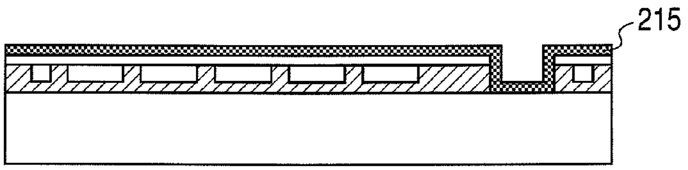

Next, as illustrated in FIG. 2J, a photoresist layer 213 is used as an etching resist and the device layer 212 and the silicon oxide film layer 203 are removed to expose the surface of the silicon single-crystal layer 202 to form an electrode extraction portion 214. After the photoresist layer 213 is removed, as illustrated in FIG. 2K, an aluminum layer 215 is formed on the surfaces of the device layer 212 and the electrode extraction portion 214.

Figure 2L:
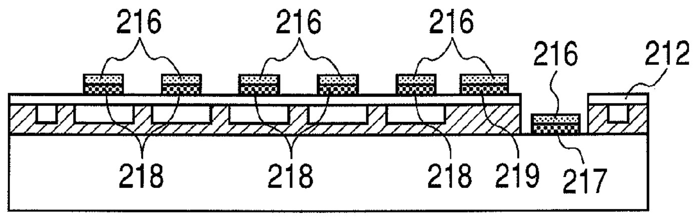
Figure 2M:
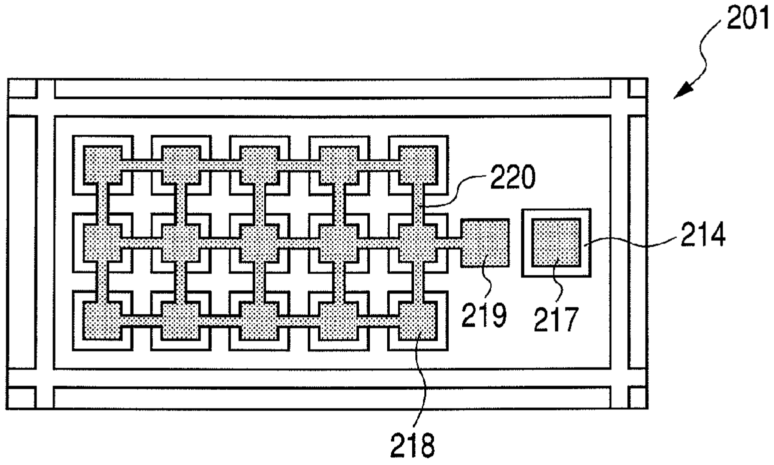

Next, as illustrated in FIG. 2L, photoresist layers 216 are used as etching resists to form an electrode 217, electrodes 218, and an electrode 219. FIG. 2M is a plan view of these electrodes seen from the electrode 217 in the same step as in FIG. 2L. Here, the electrodes in the step illustrated in FIG. 2M are under the photoresist layers 216. The electrode 217 is formed on the exposed surface of the silicon single-crystal layer 202 of the electrode extraction portion 214, and is an electrode to be electrically connected to the silicon single-crystal layer 202. The electrodes 218 are formed on the device layer 212 in the center of the cavities 206. A plurality of the electrodes 218 arranged in a two-dimensional array is electrically connected to the electrode 219 by wires 220. The electrode 219 is an electrode to electrically extract the electrodes 218 to the outside.

Figure 2N:
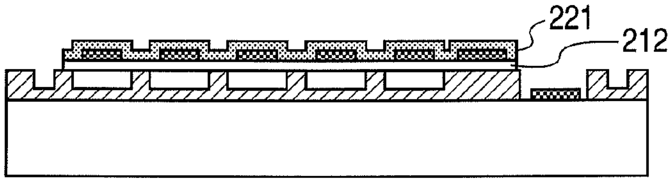
Figure 2O:
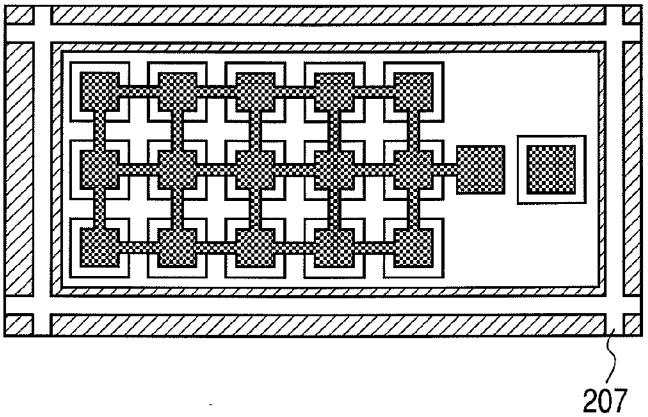
Figure 2P:
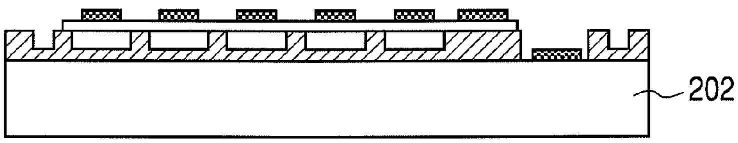

After the photoresist layers 216 are removed, as illustrated in FIGS. 2N and 2O, a photoresist layer 221 is used as an etching resist and the portion around the device layer 212 is etched. This electrical insulation is carried out so that when a plurality of electrically independent elements is provided on the same substrate, the occurrence of a short circuit between adjacent elements is prevented via the device layer 212. Finally, as illustrated in FIG. 2P, the photoresist layer 221 is removed.

Figure 3A:
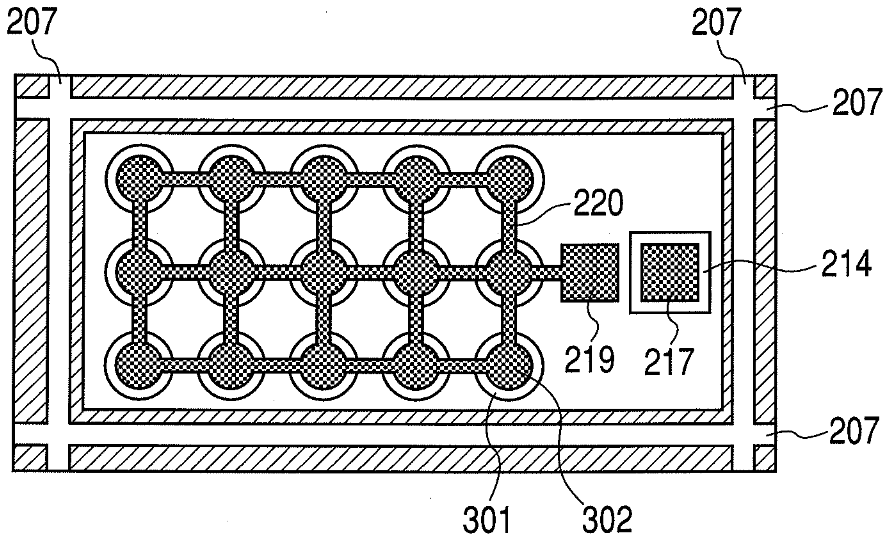
FIGS. 3A and 3B are examples of other forms of element that can be prepared by the production process illustrated in FIGS. 2A, 2B, 2C, 2D, 2E, 2F, 2G, 2H, 2I, 2J, 2K, 2L, 2M, 2N, 2O and 2P.
Figure 3B:
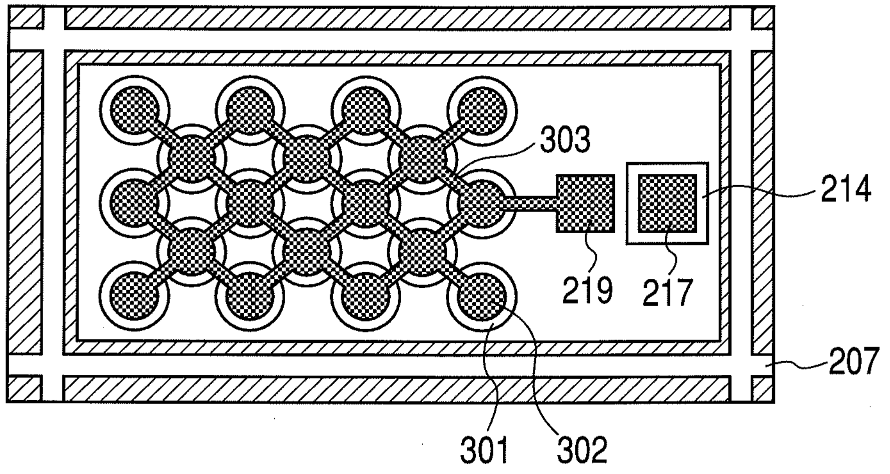

FIGS. 3A and 3B illustrate variations of the present Example illustrated in FIG. 1. FIGS. 3A and 3B are plan views corresponding to FIG. 2O. The same location as in FIGS. 2A to 2P has the same reference number. As illustrated in FIG. 3A, cavities 301 and electrodes 302 are circular. In addition, each electrode 302 is formed in the center of each cavity 301. If the cavity is circular, the deformation of the vibrating portions of the device layer 212 (membrane member) during transmitting and receiving ultrasonic is rotationally symmetric around the center of the cavity 301. Therefore, a characteristic of the variations is that the directivity during transmitting and receiving ultrasonic for each cavity 301 is conical. In FIG. 3A, a plurality of the electrodes 302 is electrically connected to the electrode 219 by the wires 220.

FIG. 3B illustrates an example where the cavities 301 are arranged out of alignment with each other by half a period, and an advantage is that cavity area can be made large with respect to element area. In FIG. 3B, a plurality of the electrodes 302 is electrically connected to the electrode 219 by wires 303.

According to the present Example, because the gas release paths are provided as described above, the gas, moisture, and the like generated during the production of a capacitive electromechanical conversion device can be released through the gas release paths. Therefore, the poor bonding of a bonded portion due to this gas and the like can be reduced. In addition, because the gas, moisture, and the like are released simply through the gas release paths in the method used, the method can improve the effect on the productivity slowdown and making the element finer compared with the conventional methods.

Example 2

Figure 4A:
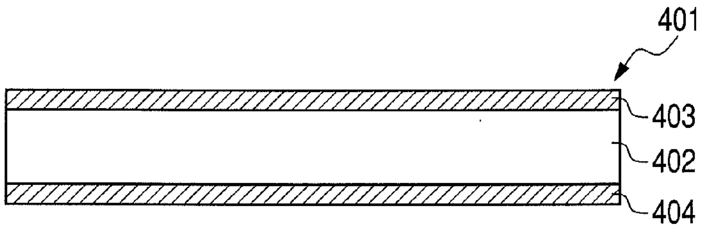
FIGS. 4A, 4B, 4C, 4D, 4E, 4F, 4G, 4H, 4I, 4J, 4K, 4L, 4M, 4N, 4O, 4P and 4Q are diagrams illustrating Example 2 relating to a production process and an element to both of which the present invention is applicable.
Figure 4B:
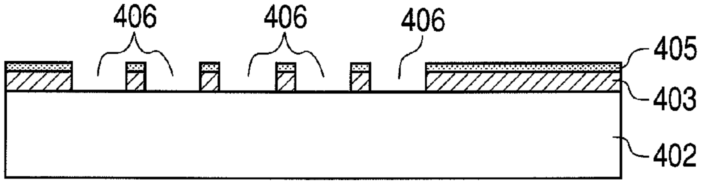
Figure 4C:
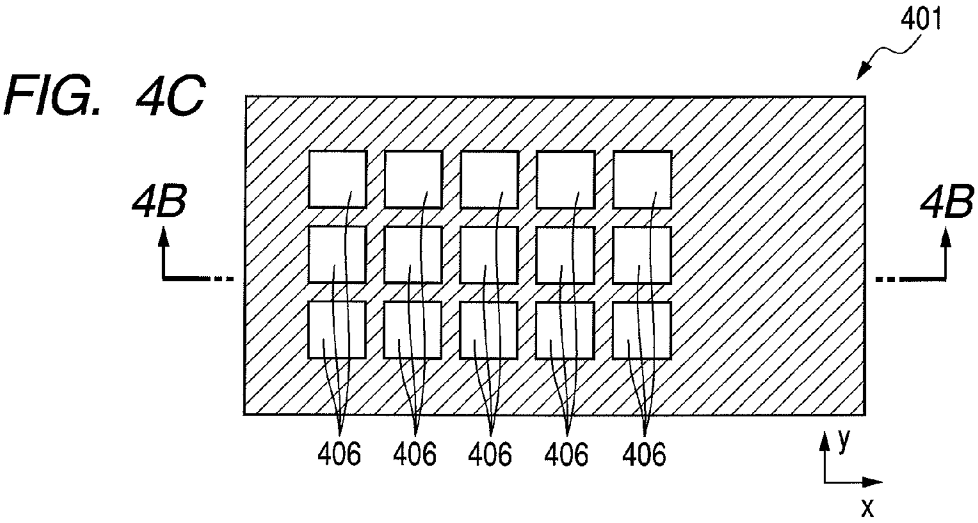
Figure 4D:
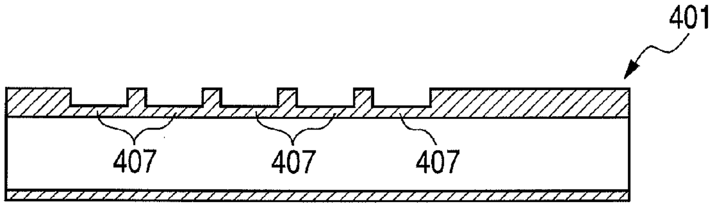
Figure 4E:
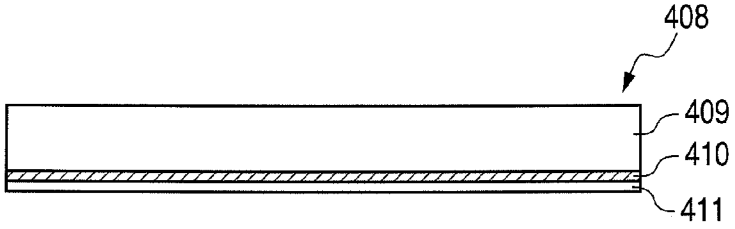
Figure 4F:
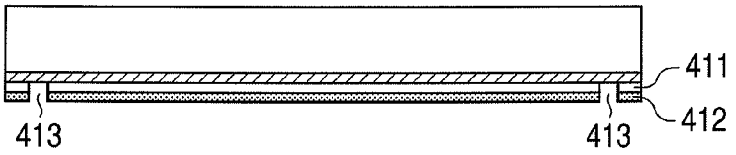
Figure 4G:
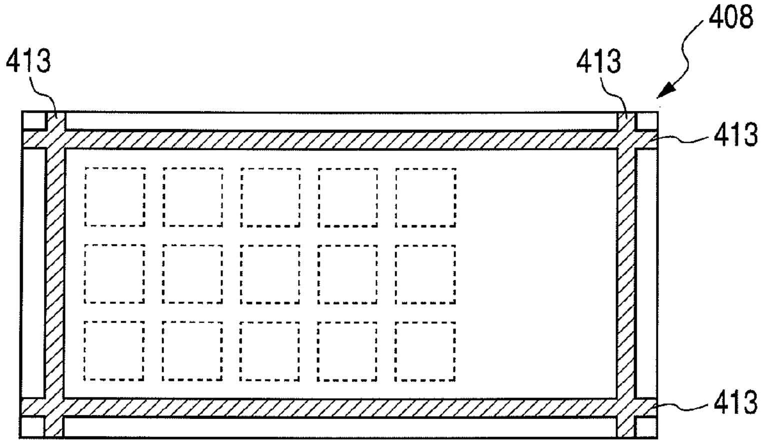
Figure 4H:
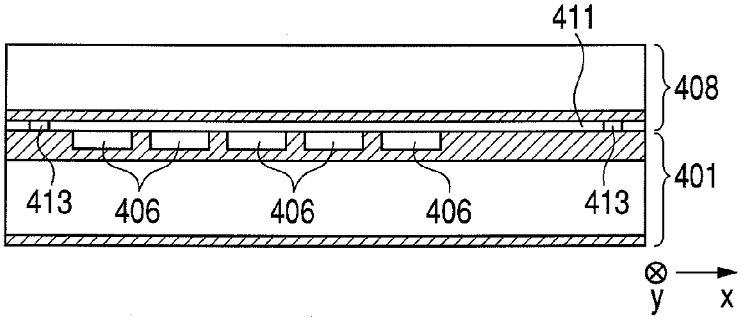
Figure 4I:
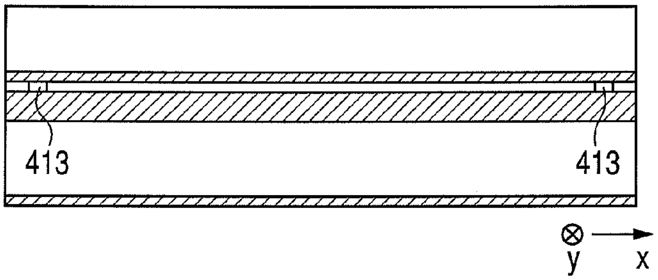
Figure 4J:
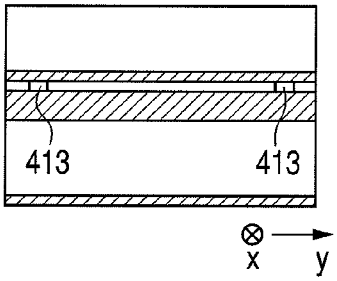
Figure 4K:
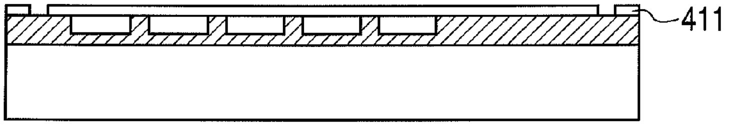
Figure 4L:
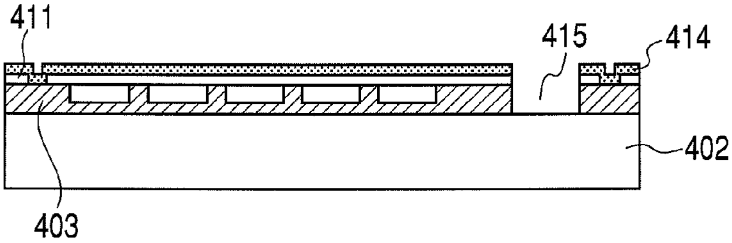
Figure 4M:
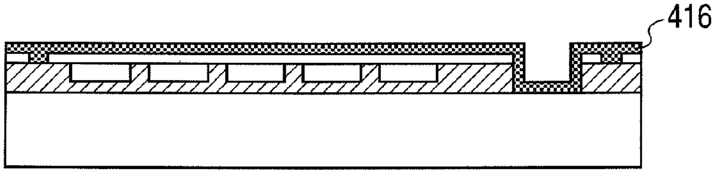
Figure 4N:
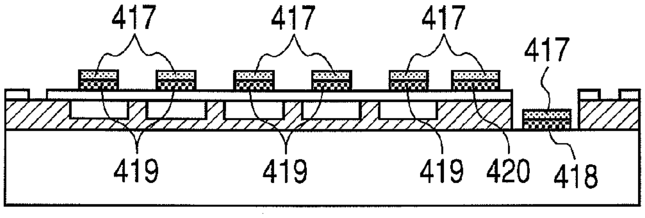
Figure 4O:
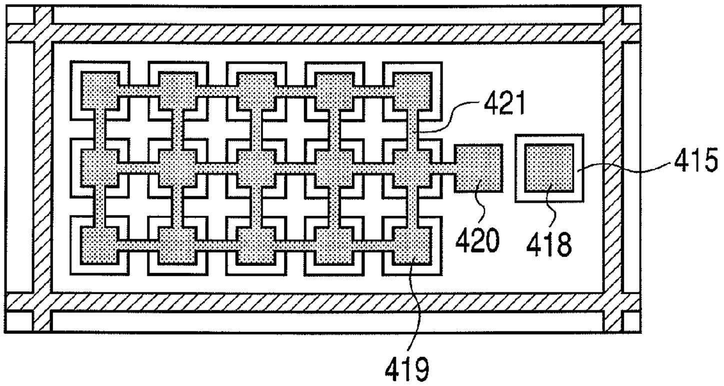
Figure 4P:
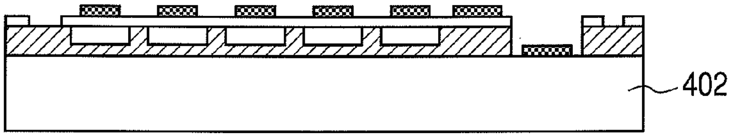
Figure 4Q:
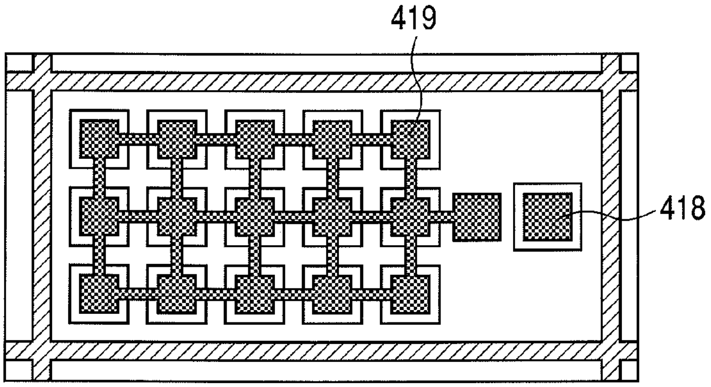

FIGS. 4A to 4Q are diagrams illustrating Example 2 relating to a process for producing the capacitive electromechanical conversion device of the present invention. The same location has the same reference number. The production process of the present Example begins at a substrate 401, a sectional view of which is illustrated in FIG. 4A. The substrate 401 includes a silicon single-crystal layer 402, and a silicon oxide film layer 403 and a silicon oxide film layer 404 formed on the top and bottom surface thereof, respectively.

First, as illustrated in FIG. 4B, a photoresist layer 405 is used as an etching resist and a silicon oxide film layer 403 is etched to form cavities (depressed portions) 406. If a hydrofluoric acid is used for etching, a silicon single-crystal layer 402 functions as an etch stop layer, making it easy to control the amount of etching in the depth direction. FIG. 4C illustrates a plan view of the cavities 406 seen from the silicon oxide film layer 403 side. The sectional view illustrated in FIG. 4B corresponds to the 4B-4B location of FIG. 4C. Even here, the cavities 406 are also square or rectangular, and arranged on the substrate 401 in a two-dimensional array. Even in the present Example, an example where 5 cavities 406 are arranged in the x-direction and 3 cavities 406 are arranged in the y-direction is illustrated.

Next, as illustrated in FIG. 4D, after the photoresist layer 405 is removed, a silicon dioxide film is formed again across the substrate 401, and an electrically insulating layer 407 is formed on the surface of the silicon single-crystal layer 402 of the cavities 406. The electrically insulating layer 407 is provided so that the electrical insulation with the silicon single-crystal layer 402 is maintained even when a device layer 411 formed in a subsequent step is bent by ultrasonic vibrations or an external static pressure and comes into contact with the bottom of the cavities 406.

Next, as illustrated in FIG. 4E, an SOI wafer 408 is prepared. The SOI wafer 408 has a structure where a handle layer 409 comprising a silicon single crystal, a buried oxide film layer 410 comprising a silicon oxide, and a device layer 411 comprising a silicon single crystal are laminated together in this order. Next, as illustrated in FIG. 4F, a photoresist layer 412 is used as an etching resist and the device layer 411 is etched to form grooves 413. The grooves 413 function as gas release pores in a subsequent step. The planar shape of the grooves 413 is illustrated in FIG. 4G. FIG. 4G is a plan view of the SOI wafer 408 in the same step as in FIG. 4F seen from the device layer 411 side, and the squares illustrated by dotted lines show the locations of the cavities 406 at which the substrate 401 is to be bonded in a subsequent step. As illustrated, the grooves 413 are formed around the cavities 406. In addition, the grooves 413 reach the ends of the SOI wafer 408.

Next, as illustrated in FIG. 4H, the surface of the substrate 401 on which the cavities 406 are formed and the surface of the device layer 411 of the SOI wafer 408 are bonded together by direct bonding. The bonding is carried out in an approximate vacuum to seal the inside of the cavities 406 to maintain the approximate vacuum. The end faces of the bonded substrate are illustrated in FIGS. 4I and J. FIGS. 4I and 4J are diagrams of the substrate in the same step as in FIG. 4H seen in the y-direction and in the x-direction, respectively. As illustrated in FIGS. 4I and 4J, the grooves 413 open to the end faces of the bonded substrate. In addition, although not illustrated, the grooves 413 also open to the opposite faces of the end faces illustrated in FIGS. 4I and 4J. Through the grooves 413, the water and gases such as oxygen generated at the bonded interface during direct bonding are released from the bonded interface to the outside.

Next, as illustrated in FIG. 2K, the handle layer 409 and the buried oxide film layer 410 are removed from the SOI wafer 408 by etching or polishing. The device layer 411 remaining is to be a membrane member. In addition, the handle layer 409 and the buried oxide film layer 410 function as membrane support layers until the device layer 411, i.e., a membrane member, is bonded to the substrate 401. The use of a hydrofluoric acid to remove the buried oxide film layer 410 can selectively leave the device layer 411 comprising a silicon single crystal.

Next, as illustrated in FIG. 4L, a photoresist layer 414 is used as an etching resist and the device layer 411 and silicon oxide film layer 403 are removed to expose the surface of the silicon single-crystal layer 402 to form an electrode extraction portion 415. After the photoresist layer 414 is removed, as illustrated in FIG. 4M, an aluminum layer 416 is formed on the surfaces of the device layer 411 and the electrode extraction portion 415.

Next, as illustrated in FIG. 4N, photoresist layers 417 are used as etching resists to form an electrode 418, electrodes 419, and an electrode 420. FIG. 4O illustrates a plan view of these electrodes in the same step as in FIG. 4N seen from the electrode 419 side. Here, the electrodes in the step of FIG. 4O are under the photoresist layers 417. The electrode 418 is formed on the exposed surface of the silicon single-crystal layer 402 of the electrode extraction portion 415 and is an electrode to be electrically connected to the silicon single-crystal layer 402. The electrode 419 is formed on the device layer 411 in the center of the cavities 406. A plurality of the electrodes 419 arranged in a two-dimensional array is electrically connected to the electrode 420 by wires 421. The electrode 420 is an electrode to electrically extract the electrodes 419 to the outside.

Finally, as illustrated in FIGS. 4P and 4Q, the photoresist layers 417 are removed.

Figure 5A:
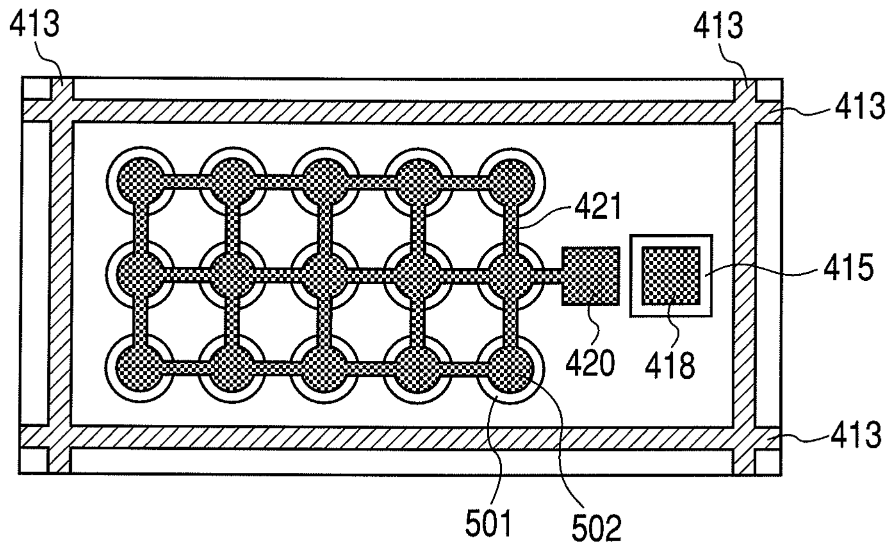
FIGS. 5A and 5B are examples of other forms of element that can be prepared by the production process illustrated in FIGS. 4A, 4B, 4C, 4D, 4E, 4F, 4G, 4H, 4I, 4J, 4K, 4L, 4M, 4N, 4O, 4P and 4Q.
Figure 5B:
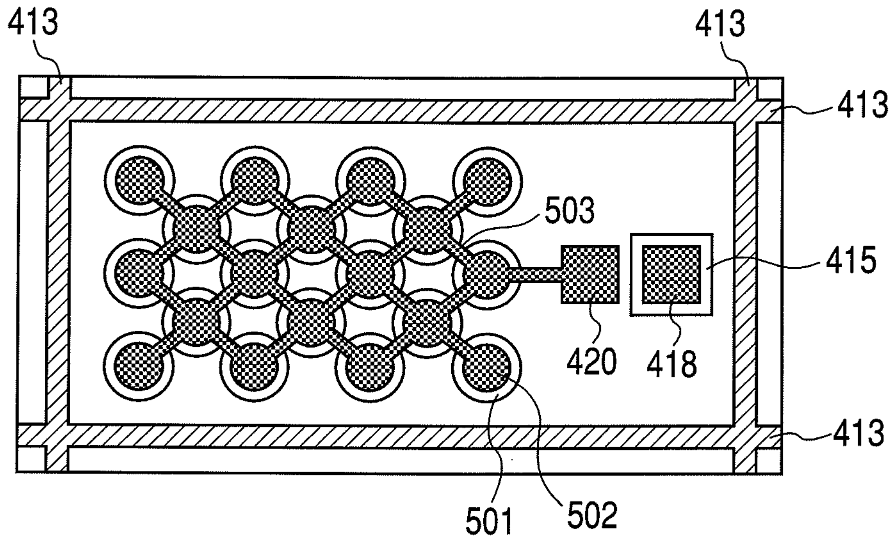

FIGS. 5A and 5B illustrate an example of another form of capacitive electromechanical conversion device that can be produced in a step equivalent to that in FIG. 4. FIGS. 5A and 5B are plan views corresponding to FIG. 4Q. The same location as in FIG. 4 has the same reference number. As illustrated in FIG. 5A, cavities 501 and electrodes 502 are circular. In addition, each electrode 502 is formed in the center of each cavity 501. If the cavity is circular, the deformation of the vibrating portions of the device layer 411 (membrane member) during transmitting and receiving ultrasonic is rotationally symmetric around the center of the cavity 501. Therefore, a characteristic of this form is that the directivity during transmitting and receiving ultrasonic for each cavity is conical. In FIG. 5A, a plurality of the electrodes 502 is electrically connected to the electrode 420 by the wires 421.

FIG. 5B illustrates an example where the cavities 501 are arranged out of alignment with each other by half a period, and an advantage is that cavity area can be made large with respect to element area. In FIG. 5B, a plurality of the electrodes 502 is electrically connected to the electrode 420 by wires 503. The grooves 413 formed on the device layer 411 in the present Example, along with the grooves 207 formed on the silicon oxide film layer 203 in Example 1, can also be provided as gas release paths. The other points in Example 2 are the same as in Example 1.

Example 3

FIGS. 6A to 6H are diagrams illustrating Example 3 relating to a process for producing the capacitive electromechanical conversion device of the present invention. The same location has the same reference number.

Figure 6A:
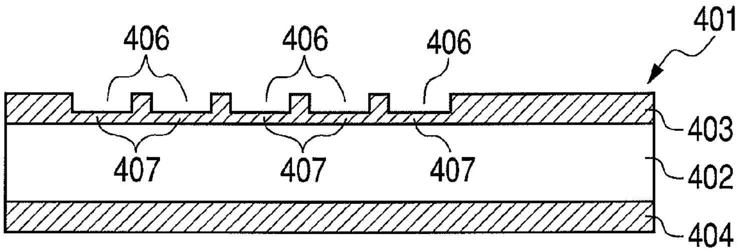
FIGS. 6A, 6B, 6C, 6D, 6E, 6F, 6G and 6H are diagrams illustrating Example 3 relating to a production process and an element to both of which the present invention is applicable.
Figure 6B:
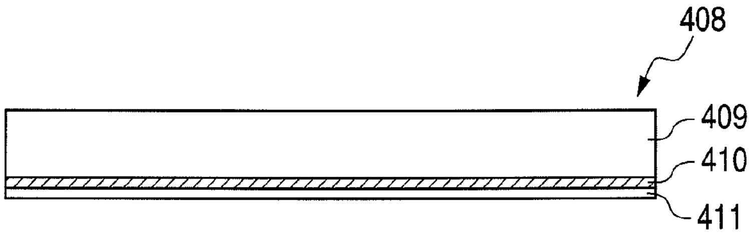
Figure 6C:
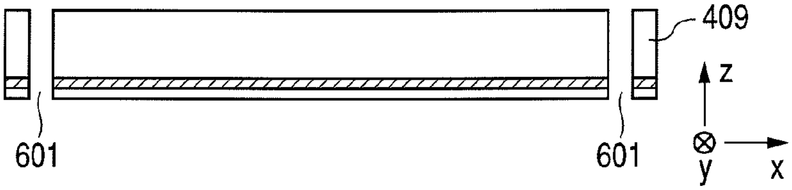

The substrate 401 illustrated in FIG. 6A is the substrate in the same step as in FIG. 4D. In addition, the substrate illustrated in FIG. 6B is an SOI wafer 408, equivalent to that in FIG. 4E, that has a structure where a handle layer 409 comprising a silicon single crystal, a buried oxide film layer 410 comprising silicon oxide, and a device layer 411 comprising a silicon single crystal are laminated together in this order. In the present Example, as illustrated in FIG. 6C, a plurality of pores 601 is formed in the SOI wafer 408 so that the pores penetrate vertically through the wafer. The pores 601 function as gas release pores in a subsequent step. For example, deep reactive ion etching (DRIE) is suitable for processing the pores 601. In DRIE, for example, $SF_6$ (sulfur hexafluoride) plasma etching and the formation of a film to protect the side walls of the pores by using $C_4F_8$ (octafluorocyclobutane) are repeatedly carried out to dig down the pores.

Figure 6D:
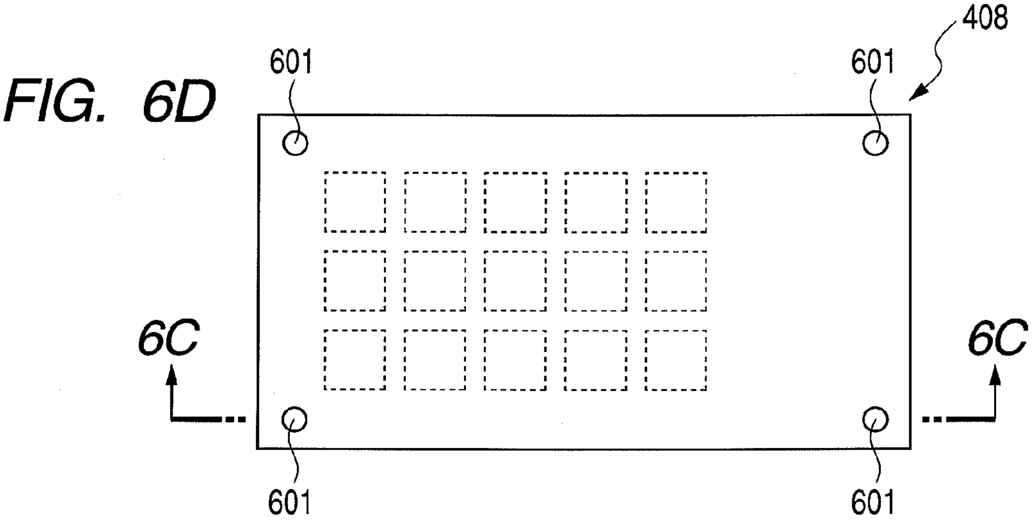

FIG. 6D is a plan view of the SOI wafer 408 seen from the handle layer 409 side. The sectional view in FIG. 6C corresponds to the 6C-6C location in FIG. 6D. The squares illustrated by dotted lines show the locations of the cavities 406 at which the substrate 401 is to be bonded in a subsequent step. As illustrated, the pores 601 are discretely formed around the cavities 406.

Figure 6E:
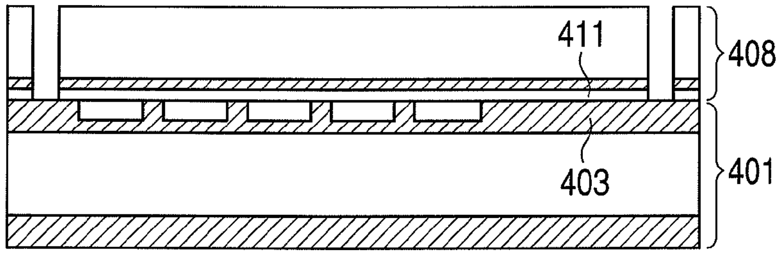

Next, as illustrated in FIG. 6E, the surface of the substrate 401 on which the cavities 406 are formed and the surface of the device layer 411 of the SOI wafer 408 are bonded together by direct bonding. The bonding is carried out in an approximate vacuum to seal the inside of the cavities 406 to maintain the approximate vacuum. The pores 601 open to the outside of the substrate, and through the pores 601, the water and gases such as oxygen generated at the bonded interface during direct bonding are removed from the bonded interface to the outside.

Figure 6F:
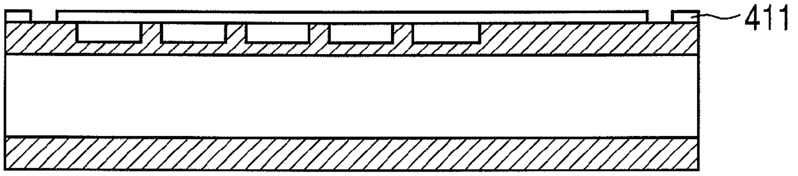

Next, as illustrated in FIG. 6F, the handle layer 409 and the buried oxide film layer 410 are removed from the SOI wafer 408 by etching or polishing. The device layer 411 remaining is to be a membrane member. In addition, the handle layer 409 and the buried oxide film layer 410 function as membrane support layers until the device layer 411, i.e., a membrane member, is bonded to the substrate 401. The use of a hydrofluoric acid to remove the buried oxide film layer 410 can selectively leave the device layer 411 comprising a silicon single crystal.

Figure 6G:
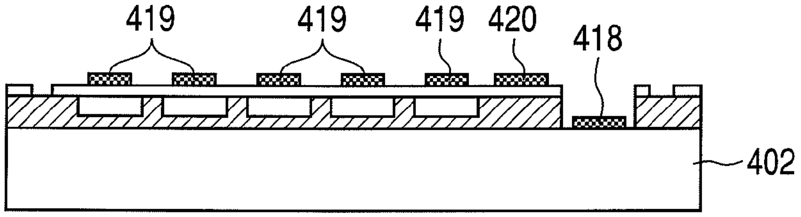
Figure 6H:
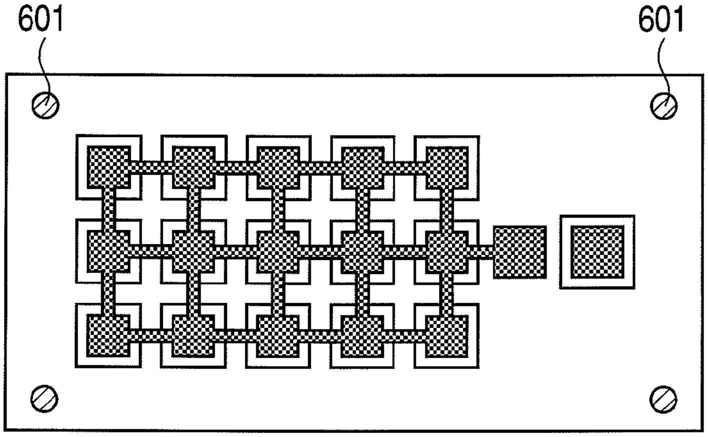

The following steps are the same as in Example 2 and thus not described below. FIG. 6F is the same as FIG. 4K, and the steps in FIGS. 6F to 6H are the same as the steps in FIGS. 4K to 4Q.

Figure 7:
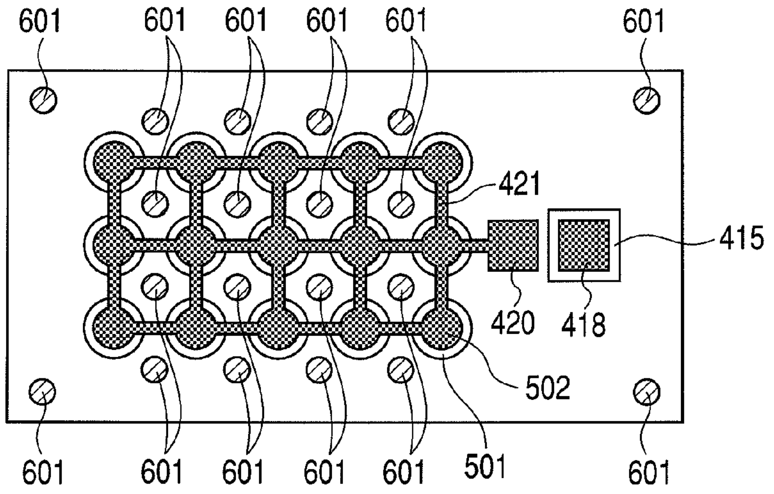
FIG. 7 is an example of other forms of element that can be prepared by the production process illustrated in FIGS. 6A, 6B, 6C, 6D, 6E, 6F, 6G and 6H.

FIG. 7 illustrates an example of other forms of capacitive electromechanical conversion device that can be produced in steps equivalent to the steps in FIGS. 6A to 6H. The same location between FIGS. 5A to 5B and FIG. 7 has the same reference number. FIG. 7 is a plan view corresponding to FIG. 6H. FIG. 7 is an example where the pores 601 are also formed between the circular cavities 501 arranged in a two-dimensional array. The formation of more pores 601 increases the efficiency with which the water and gases such as oxygen generated at the bonded interface during direct bonding are removed from the bonded interface to the outside. The pores 601 in the present Example, along with at least one of the grooves 207 in Example 1 and the grooves 413 in Example 2, can also be provided as gas release paths. The other points in Example 3 are the same as in the preceding Examples.

Example 4

FIGS. 8A to 8H are diagrams illustrating Example 4 relating to a process for producing the capacitive electromechanical conversion device of the present invention. The same location has the same reference number.

Figure 8A:
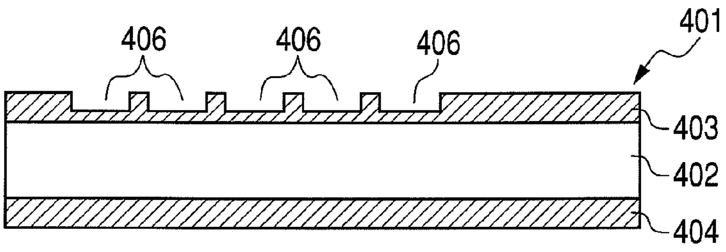
FIGS. 8A, 8B, 8C, 8D, 8E, 8F, 8G and 8H are diagrams illustrating Example 4 relating to a production process and an element to both of which the present invention is applicable.
Figure 8B:
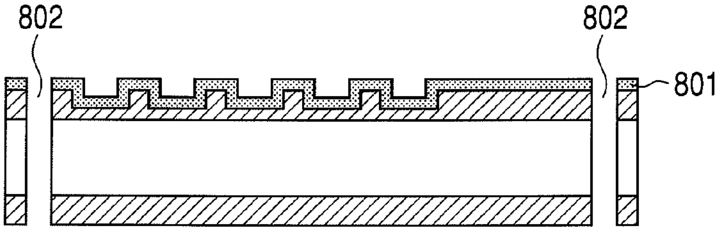
Figure 8C:
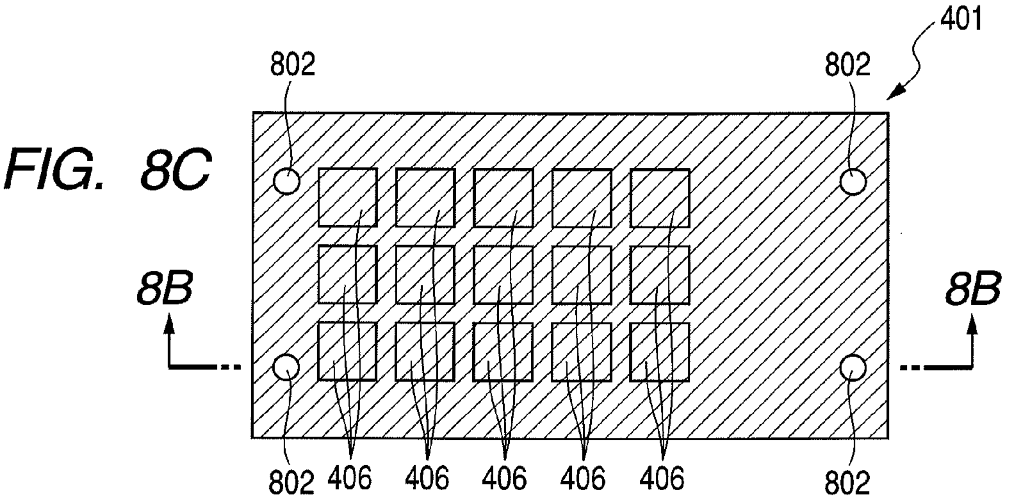
Figure 8D:
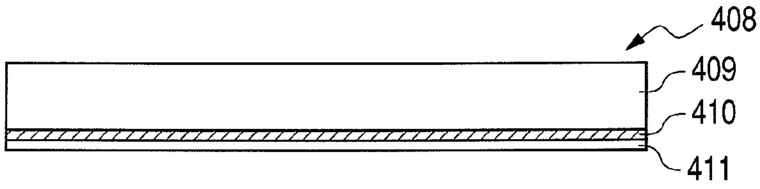

The substrate 401 illustrated in FIG. 8A is the substrate in the same step as in FIG. 4D. In the present Example, as illustrated in FIG. 8B, a photoresist layer 801 is used as an etching resist and the substrate 401 is etched to form pores 802 penetrating vertically through the substrate. The pores 802 function as gas release pores in a subsequent step. The DRIE process is suitable for processing the pores 802. FIG. 8C illustrates planar shapes of the cavities 406 and the pores 802. The sectional view in FIG. 8B corresponds to the E-E location in FIG. 8C. The shape and arrangement of the cavities 406 are the same as in Example 2. As illustrated, the pores 802 are discretely formed around the cavities 406. FIG. 8D illustrates an SOI wafer 408 equivalent to that in FIG. 4E.

Figure 8E:
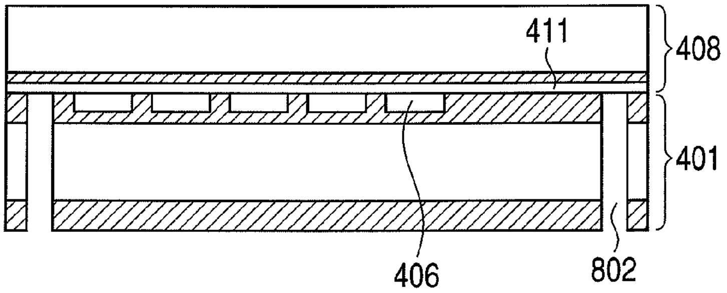

Next, as illustrated in FIG. 8E, the surface of the substrate 401 on which the cavities 406 are formed and the surface of the device layer 411 of the SOI wafer 408 are bonded together by direct bonding. The bonding is carried out in an approximate vacuum to seal the inside of the cavities 406 to maintain an approximate vacuum. The pores 802 open to the outside of the substrate, and the water and gases such as oxygen generated at the bonded interface during direct bonding are removed from the bonded interface to the outside.

Figure 8F:
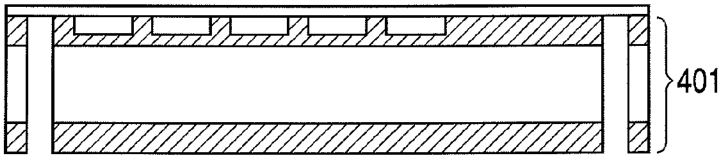

Next, as illustrated in FIG. 8F, the handle layer 409 and the buried oxide film layer 410 are removed from the SOI wafer 408 in a step equivalent to that in FIG. 4K of Example 2. The device layer 411 remaining is to be a membrane member. In addition, the handle layer 409 and the buried oxide film layer 410 function as membrane support layers until the device layer 411, i.e., the membrane member, is bonded to the substrate 401.

Figure 8G:
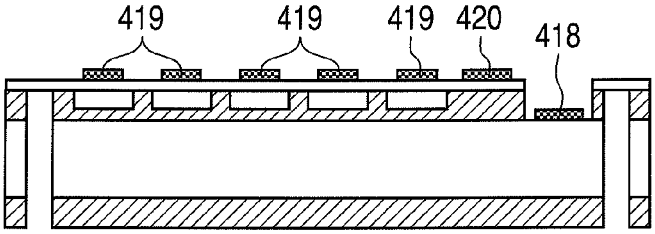
Figure 8H:
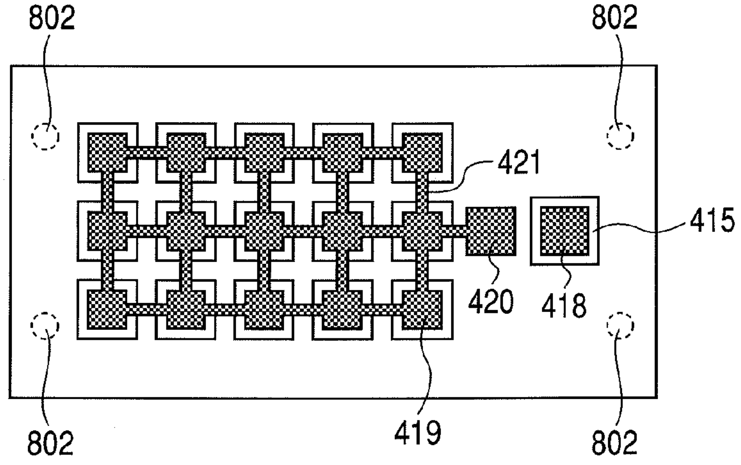

The following steps are the same as in Example 2. Specifically, the steps in FIGS. 8F to 8H are the same as the steps in FIGS. 8K to 8Q.

Figure 9:
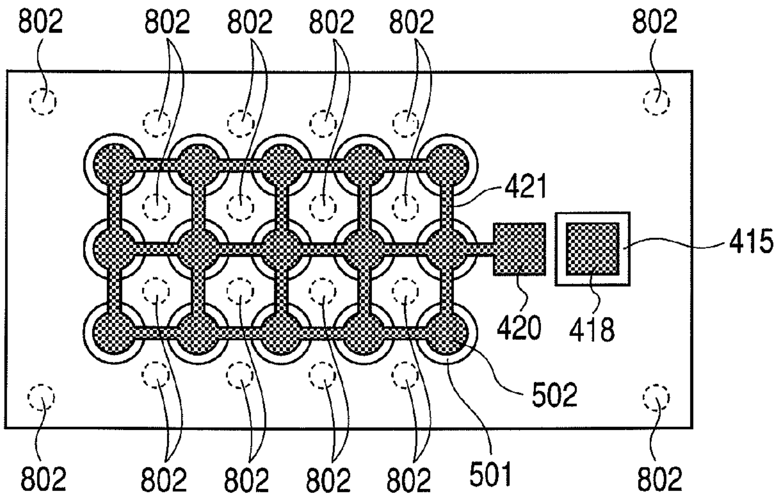
FIG. 9 is an example of other forms of element that can be prepared by the production process illustrated in FIGS. 8A, 8B, 8C, 8D, 8E, 8F, 8G and 8H.

FIG. 9 illustrates an example of other forms of capacitive electromechanical conversion device that can be produced in steps equivalent to the steps in FIGS. 8A to 8H. The same location between FIGS. 5A to 5B and FIG. 9 has the same reference number. FIG. 9 is a plan view corresponding to FIG. 8H. FIG. 9 illustrates an example where the pores 802 are also formed between the approximately circular cavities 501 arranged in a two-dimensional array. The formation of more pores 802 increases the efficiency with which the water and gases such as oxygen generated at the bonded interface during direct bonding are removed from the bonded interface to the outside. The pores 802 in the present Example, along with at least one of the grooves 207 in Example 1, the grooves 413 in Example 2, and the pores 601 in Example 3, can also be provided as gas release paths. The other points in Example 4 are the same as in the preceding Examples.

Example 5

FIGS. 10A to 10G are diagrams illustrating Example 5 relating to a process for producing the capacitive electromechanical conversion device of the present invention. The same location has the same reference number.

Figure 10A:
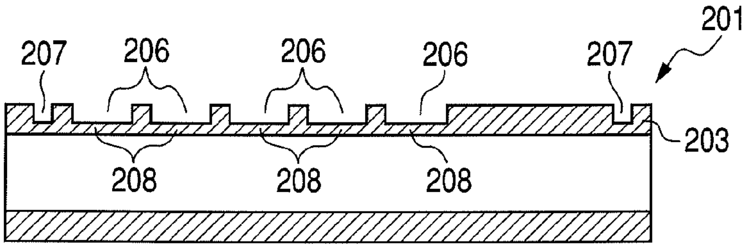
FIGS. 10A, 10B, 10C, 10D, 10E, 10F and 10G are diagrams illustrating Example 5 relating to a production process and an element to which the present invention is applicable.
Figure 10B:
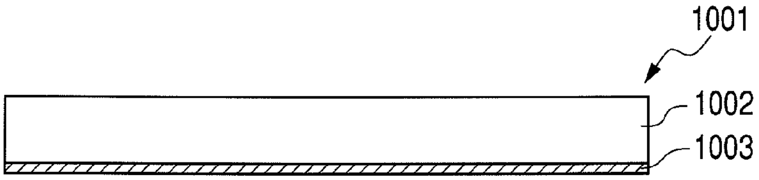
Figure 10C:
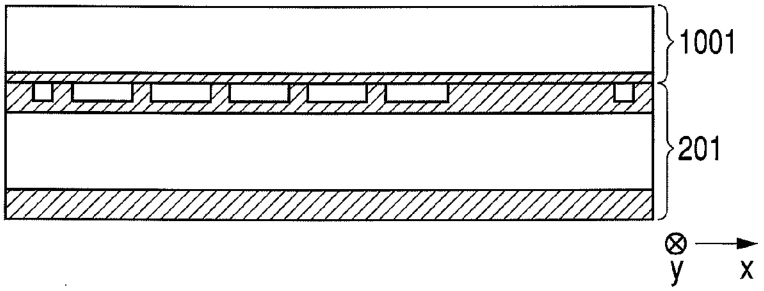
Figure 10D:
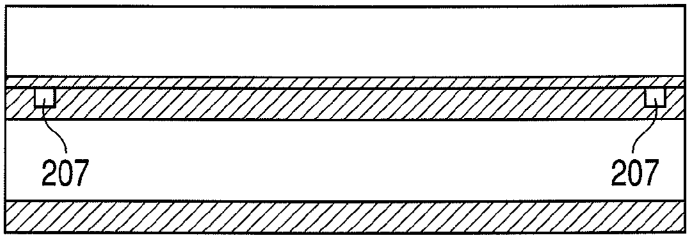
Figure 10E:
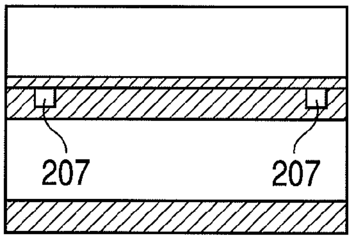

The substrate 201 illustrated in FIG. 10A is the same as that in FIG. 2D. In the present Example, in the substrate 1001 illustrated in FIG. 10B, a silicon nitrogen compound layer 1003 is formed by chemical vapor deposition (CVD) on the surface of a silicon single-crystal layer 1002. As illustrated in FIG. 10C, the surface of the silicon nitrogen compound layer 1003 of the substrate 1001 and the surface of the substrate 201 on which the cavities 206 and the grooves 207 are formed are bonded together by direct bonding. The bonding is carried out in an approximate vacuum to seal the inside of the cavities 206 to maintain the approximate vacuum. The end faces of the bonded substrates are illustrated in FIGS. 10D and 10E. FIGS. 10D and 10E are diagrams of the substrate in the same step as in FIG. 10C seen in the y-direction and in the x-direction, respectively. As illustrated in FIGS. 10D and 10E, the grooves 207 open to the end faces of the bonded substrates. In addition, although not illustrated, the grooves 207 open to the opposite faces of the end faces in FIGS. 10D and 10E. Through the grooves 207, the water and gases such as oxygen generated at the bonded interface during direct bonding are removed from the bonded interface to the outside.

Figure 10F:
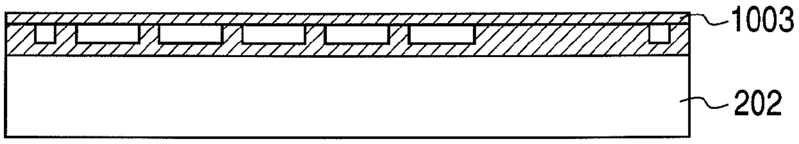
Figure 10G:
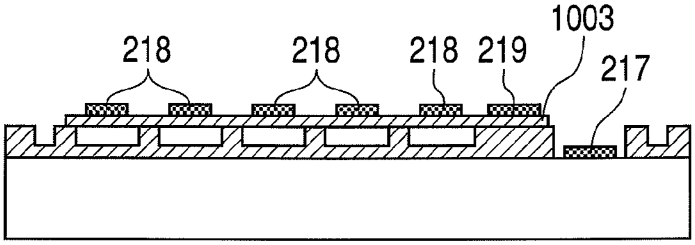
Figure 11:
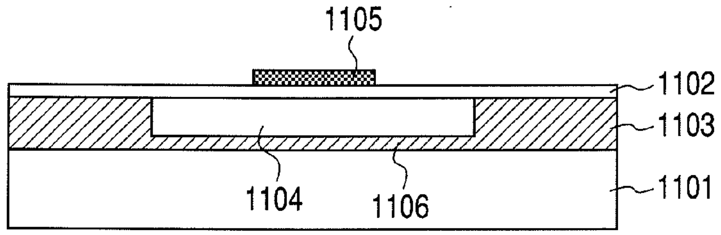
FIG. 11 is a diagram illustrating the background art.
Figure 12A:
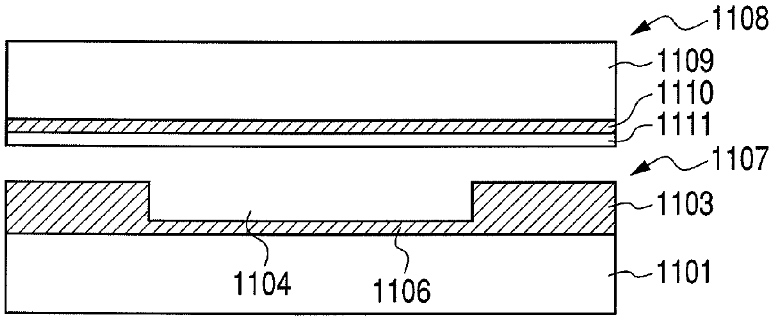
FIGS. 12A, 12B, 12C and 12D are diagrams illustrating the background art.
Figure 12B:
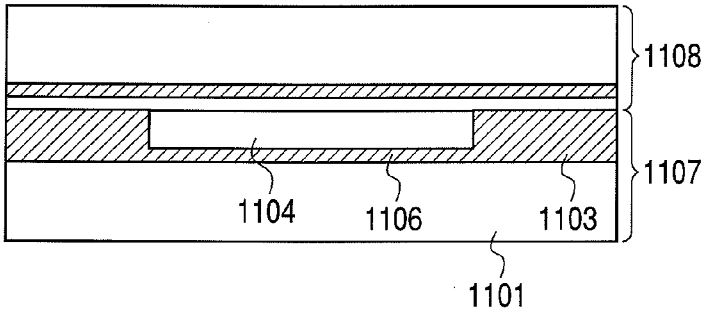
Figure 12C:
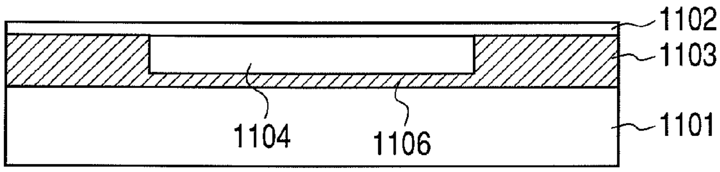
Figure 12D:
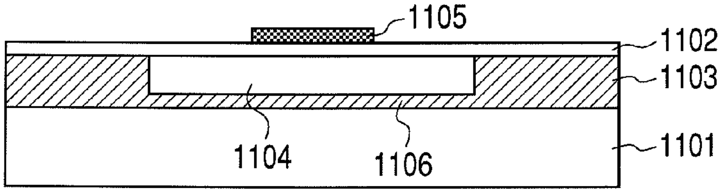

Next, as illustrated in FIG. 10F, the silicon single-crystal layer 1002 is removed from the substrate 1001 by etching or polishing. The use of an aqueous solution of KOH (potassium hydroxide) to remove the silicon single-crystal layer 1002 can selectively leave the silicon nitrogen compound layer 1003. The silicon nitrogen compound layer 1003 remaining is to be a membrane member. In addition, the silicon single-crystal layer 1002 functions as a membrane support layer until the silicon nitrogen compound layer 1003, i.e., the membrane member, is bonded to the substrate 201.

The following steps are the same as the steps in FIGS. 2J to 2P and thus not described below. The step in FIG. 10F is the same as the step in FIG. 2I, and the silicon nitrogen compound layer 1003 corresponds to the device layer 212 in FIG. 2I. The grooves 207 in the present Example can also be combined with at least one of the grooves 413 in Example 2, the pores

601 in Example 3, and the pores 802 in Example 4. The other points in Example 5 are the same as in the preceding Examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-150224, filed Jun. 9, 2008, which is hereby incorporated by reference herein in its entirety.

The invention claimed is:

1. A process for producing a capacitive electromechanical conversion device by bonding together a substrate and a membrane member to form a cavity sealed between the substrate and the membrane member, the process for producing a capacitive electromechanical conversion device comprising the steps of:

providing a gas release path in at least one of the substrate and the membrane member, and forming the cavity by bonding the membrane member with the substrate after providing the gas release path;

wherein the gas release path protrudes along a bonded interface between the substrate and the membrane member, communicates with the outside, and does not communicate with the cavity.

2. The process for producing a capacitive electromechanical conversion device according to claim 1, characterized in that a depressed portion is formed on the surface of the substrate, and the membrane member on the whole is in thin film form, and the cavity is formed at the depressed portion by bonding the membrane member with the substrate.

3. The process for producing a capacitive electromechanical conversion device according to claim 1, characterized in that the gas release path is provided so that the path extends around the bonded interface and communicates with the outside.

4. The process for producing a capacitive electromechanical conversion device according to claim 1, characterized in that the gas release path is provided so that the path extends from the bonded interface through the membrane member and communicates with the outside.

5. The process for producing a capacitive electromechanical conversion device according to claim 1, characterized in that the gas release path is provided so that the path extends from the bonded interface through the substrate and communicates with the outside.

6. The process for producing a capacitive electromechanical conversion device according to claim 1, characterized in that in bonding the membrane member with the substrate, the bonding is carried out with the membrane member supported by a membrane support layer, and the gas release path is provided so that the path extends from the bonded interface through the membrane member and the membrane support layer and communicates with the outside.

7. The process for producing a capacitive electromechanical conversion device according to claim 6, characterized in that the membrane support layer is removed after bonding the membrane member with the substrate.

8. The process for producing a capacitive electromechanical conversion device according to claim 1, characterized in that bonding the membrane member with the substrate is carried out at a pressure lower than atmospheric pressure.

9. A capacitive electromechanical conversion device obtained by bonding together a substrate and a membrane member to form a cavity sealed between the substrate and the membrane member, comprising:

a path which protrudes along a bonded interface between the substrate and the membrane member, communicates with the outside, and does not communicate with the cavity, provided in at least one of the substrate and the membrane member, wherein an end of the path opens to the outside at a portion between the substrate and the membrane member.

10. The capacitive electromechanical conversion device according to claim 9, characterized in that the substrate is a substrate on the surface of which a depressed portion is formed, the membrane member on the whole is in thin film form, and the depressed portion forms the cavity.

* * * * *